UNITED STATES PATENT OFFICE.

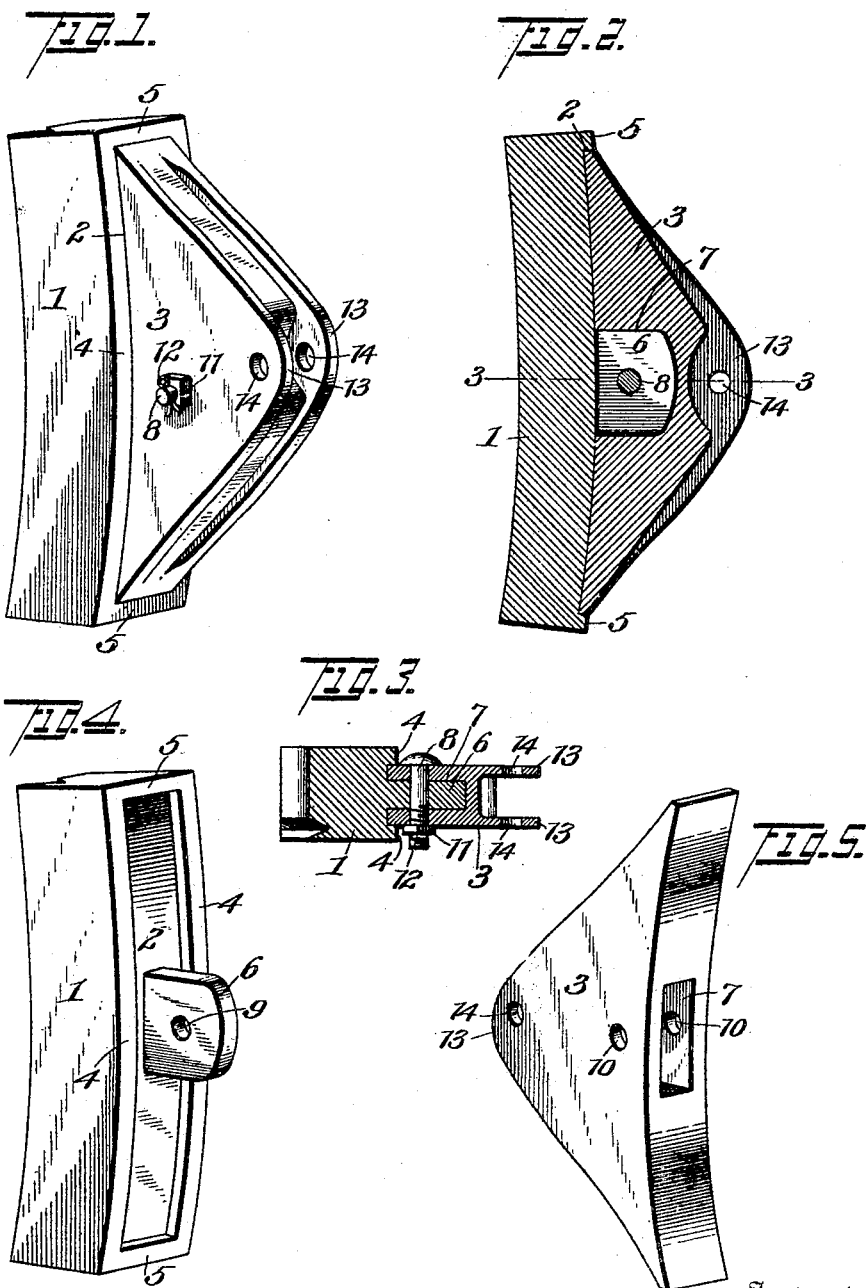

HENRY H. URQUHART, OF PADUCAH, KENTUCKY.

BRAKE-SHOE FOR LOCOMOTIVES.

No. 800,694.　　　　　Specification of Letters Patent.　　　　　Patented Oct. 3, 1905.

Application filed July 20, 1905. Serial No. 270,524.

*To all whom it may concern:*

Be it known that I, HENRY H. URQUHART, a citizen of the United States, residing at Paducah, in the county of McCracken and State of Kentucky, have invented a new and useful Brake-Shoe for Locomotives, of which the following is a specification.

The invention relates to improvements in brake-shoes for locomotives.

The object of the present invention is to improve the construction of brake-shoes for locomotives and to provide a simple, inexpensive, and efficient construction of great strength and durability, which may be readily inspected and which will be effectually prevented from flying off when worn and wrecking or otherwise injuring a locomotive.

A further object of the invention is to provide a brake-shoe of this character which in the event of the derailment of an engine may be quickly removed to prevent it from being injured when the engine is replaced on the rails.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a brake-shoe and brake head or block constructed in accordance with this invention. Fig. 2 is a longitudinal sectional view. Fig. 3 is a transverse sectional view on the line 3 3 of Fig. 2. Fig. 4 is a detail perspective view of the brake-shoe, illustrating the construction of the inner or rear face of the same. Fig. 5 is a detail perspective view of the brake block or head.

Like numerals of reference designate corresponding parts in all the figures of the drawings.

1 designates a brake-shoe designed for use on locomotives and provided at its inner or rear face with a longitudinal depression or recess 2 for the reception of a brake block or head 3 of the ordinary construction. The brake-shoe is provided at the recess 2 with marginal side and end walls 4 and 5, consisting of flanges and snugly embracing the brake block or head, as clearly illustrated in Figs. 2 and 3 of the drawings, whereby the latter when in engagement with the driving-wheel of a locomotive will be effectually prevented from leaving the brake block or head.

The brake-shoe is provided at the center of the recess 2 with a projecting lug or flange 6, forming a narrow shank which is received within a socket 7 of the brake block or head. The socket 7 has side and end walls to snugly fit the lug 6, which is secured in the socket by means of a transverse bolt 8, piercing the side walls of the socket and extending through a perforation 9 of the lug. The perforation 9 of the lug registers with correspondingly-alined perforations 10 of the brake block or head, and the bolt is provided at the outer side of the brake block or head with a nut 11 and a key 12 for preventing the nut from unscrewing. By locating the nut 11 and the key 12 at the outer face of the brake block or head access is readily had to the bolt, and in the event of the derailment of a locomotive the brake-shoe may be readily detached to prevent the same from being broken when the locomotive is drawn back on the rails.

The brake block or head, which is of the ordinary form, tapers rearwardly and is provided at the back with opposite ears or flanges 13, having perforations 14 for the reception of the pivot of the eccentric lever of a locomotive.

By fitting the brake block or head in the recess of the inner or rear face of the brake-shoe the latter is interlocked with the brake block or head and held against lateral and longitudinal movement on the same. This construction, in connection with the shank and the means for securing the same to the brake block or head, will permit the brake-shoe to be entirely worn out without becoming accidentally disconnected from the brake block or head, and there will be no liability of the brake-shoe accidentally flying off the brake block or head, as is often the case where bolts are employed for securing the brake-shoe to the brake block or head. When bolts are employed for securing the brake-shoe to the brake block or head, the heads of the bolts are worn away with the brake-shoe, and the latter is liable to fly off and injure the mechanism of a locomotive. Also the attaching means for the brake-shoe enable the same to be readily inspected and obviate the necessity of crawling beneath an engine to ascertain if the brake-shoes are in proper position.

Having thus fully described my invention, what I claim as new, and desire to secure by Letters Patent, is—

1. In a device of the class described, the combination with a brake block or head, of a brake-shoe provided in its rear face with a recess receiving the brake block or head, said brake-shoe being provided at the said recess with side and end walls, whereby it is held against lateral and longitudinal movement, and means for securing the brake-shoe to the brake block or head.

2. In a device of the class described, the combination with a brake block or head, of a brake-shoe provided in its rear face with a recess receiving the brake block or head, said brake-shoe being provided at the said recess with side and end walls, whereby it is held against lateral and longitudinal movement, and means for securing the brake-shoe to the brake block or head, said means being located in rear of the brake-shoe to permit the latter to be worn out without affecting the securing means.

3. In a device of the class described, the combination of a brake block or head provided with a socket having side and end walls, a brake-shoe provided at its rear face with a recess receiving the brake block or head and having side and end walls for engaging the same, said brake-shoe being also provided with a lug extending into the socket of the brake block or head, and fastening means for securing the lug to the brake block or head.

4. In a device of the class described, the combination of a brake block or head provided with a socket having side and end walls, a brake-shoe provided at its rear face with a recess receiving the brake block or head and having side and end walls for engaging the same, said brake-shoe being also provided with a lug extending into the socket of the brake block or head, and a transverse fastening device piercing the brake block or head and the lug and having exteriorly-arranged means for detachably holding it in position.

In testimony that I claim the foregoing as my own I have hereto affixed my signature in the presence of two witnesses.

HENRY H. URQUHART.

Witnesses:
R. L. CRAMP,
LEVI BOND.